March 10, 1925.  1,528,809
F. H. WOLEVER
GAS AND AIR MIXER
Filed March 6, 1920
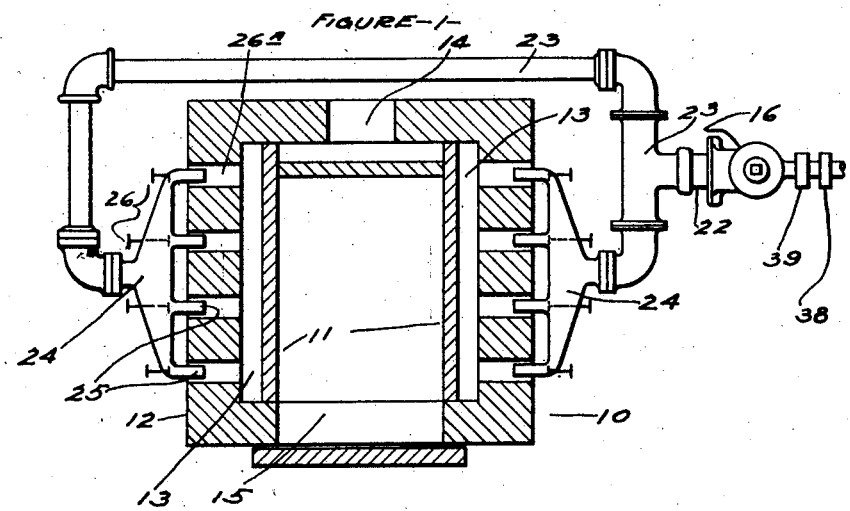
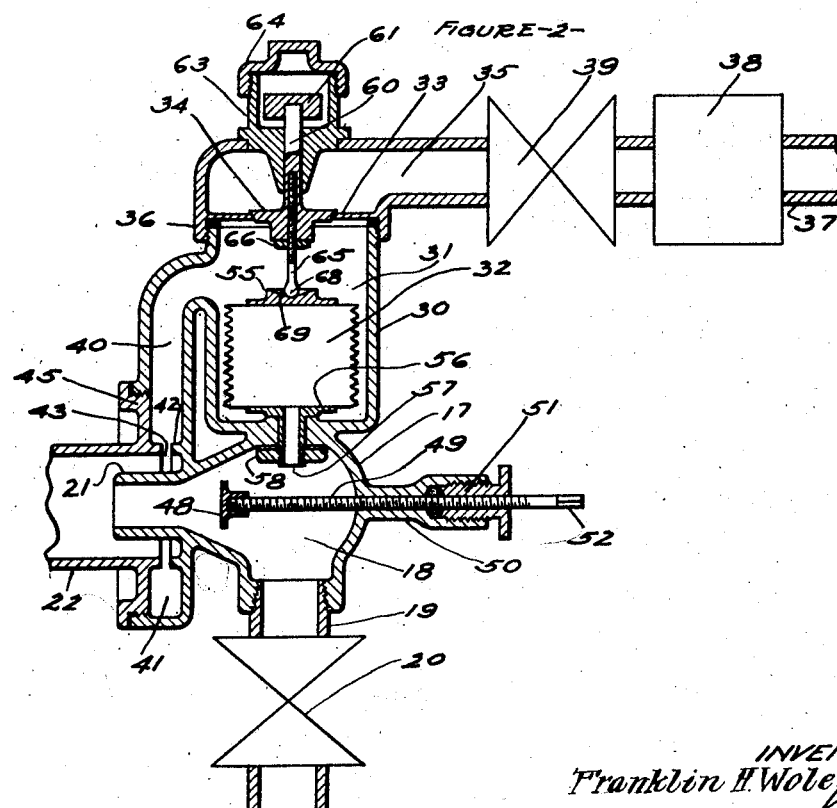
INVENTOR
Franklin H. Wolever
ATTORNEY Patented Mar. 10, 1925.

1,528,809

UNITED STATES PATENT OFFICE.

FRANKLIN H. WOLEVER, OF CHICAGO, ILLINOIS.

GAS AND AIR MIXER.

Application filed March 6, 1920. Serial No. 363,683.

*To all whom it may concern:*

Be it known that I, FRANKLIN H. WOL-EVER, a citizen of the United States, and a resident of Chicago, in the county of Cook and State of Illinois, have invented certain new and useful Improvements in Gas and Air Mixers; and I do hereby declare that the following is a full, clear, and exact description thereof, reference being had to the accompanying drawings, and to the characters of reference marked thereon, which form a part of this specification.

This invention relates to a novel automatic gas and air mixer adapted for use to automatically control the volume of the burning mixture while defining and maintaining the proportions of the constituents thereof, such as air and artificial or natural gas or vaporized oil, such mixture to be burned for heating to a high temperature mufflers, boilers, furnaces and the like.

The present gas and air mixer is arranged to be used in situations where the air constituent of the fuel is admitted to the gas and air mixer at a pressure above the atmosphere and is by the gas and air mixer properly mixed with the gas constituent of the fuel, which may be furnished at desired pressures, to properly proportion the fuel constituents, so that a fuel may be supplied in proper constituent proportions and at varying volumes to produce highly efficient and uniform combustion.

My improved gas and air mixer is herein shown as adapted to a manually adjustable air valve which will automatically introduce the proper amount of gas to the gas and air mixer to ensure a given ratio of gas and air for proper combustion under a wide range of air control and volume of the burning mixture. Said gas and air mixer may be connected to a manifold or manifolds having as many outlets as will give the best distribution of the fuel mixture in the muffler chamber or furnace in which the fuel is burned, as well also to accommodate it to different arrangements of furnaces, muffler chambers and the like.

I have shown in the drawings one embodiment of the invention which is effective to carry out the principles of the invention, but it will be understood that the structural details of said embodiment may be considerably changed within the spirit and scope of the claims appended hereto, and that the invention is not therefore limited to the illustrated embodiment except as to claims wherein specific details are set forth, and as imposed by the prior art.

In the drawings—

Figure 1 is a partial plan and partial sectional view showing one type of furnace or muffler to which my improved gas and air mixer is applied;

Fig. 2 is a sectional view of the gas and air mixer device itself.

Referring now more specifically to the construction of the embodiment illustrated in the drawings, 10 designates what is intended to indicate a furnace for use in the enameling art, wherein the interior walls 11 surround a space in the furnace to receive the articles to be heated, and where there is provided between said interior walls and the exterior heavier walls 12 a combustion chamber or chambers 13 in which the fuel is burned; said furnace having an exit 14 for the products in combustion and a door opening 15 closed by a suitable form of door.

16 designates as a whole (Figure 1) the improved gas and air mixer device embodying my invention. It is best shown in Fig. 2 in respect of its general construction and is made as follows:

17 designates as a whole a casing enclosing an air chamber 18 which is supplied with air through a pipe 19 having a controlling valve 20. The pipe 19 is adapted for connection to a source supplying air under pressure. The said chamber 18 is of generally oval shape and it has a discharge nozzle 21 that discharges into, and is disposed axially with respect of, an outlet conduit 22 or mixing chamber through which the fuel mixture, mixed as hereinafter described, is discharged, as by branches 23 to manifolds 24. Each manifold has a number of outlets 25 that enter and discharge into and through feed openings 26ª in the outer heavier wall of the furnace and therethrough to the combustion chambers 13. The said manifold outlets will in practice be associated with any suitable form of tuyères whereby a desired proportion of free air may be drawn into the combustion chamber with the fuel mixture. The said outlets 25 are severally controlled by regulating or cut-off valves 26.

The casing 17 of the air chamber 18 may be made integral with or is fixed to a casing 30 which encloses a controller chamber 31 that contains an expanding chamber 32 or bellows which is operative to control the supply of the gas constituent of the fuel to said chamber 31 in a manner hereinafter to be described. The upper wall 33 of said chamber 31, is provided with a port that is controlled by a valve 34. As shown, said upper wall 33 is formed as part of the lower wall of a gas chamber 35 the lower wall of which has a nipple 36 which is threaded to the upper end of the casing 30. Said gas chamber 35 is adapted to deliver gas on the upper side of the wall 33 at a constant pressure from a suitable source of supply; and this constant pressure may be obtained through a pipe 37 and a pressure regulator device diagrammatically indicated by 38 between which and the chamber 35 is located a cut-off valve 39 of any suitable form.

The gas chamber 31 in the casing 30 communicates with a side passage 40 that terminates in a chamber 41 that is in open communication with the outlet conduit or mixing chamber 22 and is concentric thereto, the inner end of the chamber being spaced away from a circular flange 42 of the inner wall of said passage 40 so as to provide an annular communicating passage or gas nozzle 43 for the passage of gas from the chamber 31 through the passage 40 to the mixing chamber or conduit. In the present instance the said conduit or mixing chamber 22 is made an integral part of a threaded flange 45 that is threaded into an opening in the outer wall of the passage 40 in a manner to produce a gas tight joint.

By reason of the fact that the nozzle 21 of the air chamber 18 extends into the end of the conduit or mixing chamber 22 and is co-axial therewith, it will be observed that both the air and gas are discharged into said mixing chamber 22 for preliminary admixture and that the fuel constituents are further mixed as they flow through the tortuous branches 23 and the muffler heads 24.

Means are provided which will now be described for maintaining the volume of gas which will be delivered through the port controlled by the valve 34 to correspond to the volume of air discharged by the pipe 19 to and through the air chamber 18 to the mixing chamber 22, and also for varying the volume of air discharged into and through said chamber 18 and thereby the volume of gas discharged into the chamber 31 for mixture with the air at the nozzle 21. The means for effecting these various results are made as follows:

A baffling element or disk 48 is located in the air chamber 18 adjacent to the nozzle 21. Said baffling element is attached to the inner end of a threaded stem 49 that extends through and has threaded connection with a nipple 50 shown as constituting an integral part of the casing 17. Said stem extends beyond said nipple through a suitable gland or stuffing box 51 and is provided with an outer squared end 52 by which the threaded shaft may be turned so as to move the baffling element 48 towards and from the nozzle 21 of the air chamber 18.

The said expanding chamber 32, the expanding and contracting walls of which may be made of any suitable bellows or like construction, is provided with upper and lower heads 55, 56. 57 designates a tubular stem which is fixed to or made part of the lower head 56 and said stem extends through the wall dividing the control chamber 31 from the air chamber 18. It is threaded at its lower end to receive a locking nut 58, by which and the lower head 56 of said bellows is fixed or anchored in place, a washer, if necessary, being interposed between the nut 58 and the opposing face of said separating or dividing wall.

The valve 34 is fixed or made part of an upright stem 60 that may carry at its upper end a weight 61 that tends to hold the valve 34 on its seat; said weight being enclosed in a casing 63 fitted to the upper wall of the supply chamber and provided with a removable cover 64. Variation of this weight controls the force necessary to raise the valve 34 in its open position. The casing is formed also to provide a substantial guide for the stem 60. 65 designates a stem that is threaded to enter and engage an axial opening in the valve and its stem, and lock nut 66 threaded to said stem below the valve provides for contact between 55 and 65, or varies extent of prolongation from valve to plate 55. The lower end of the stem is headed at 68 and engages a depressed concave seat 69 in the upper wall or head 55 of the expanding chamber 32.

The operation of the gas and air mixer is as follows:

The valve 39 is opened and gas is admitted to the chamber within the conduit or pipe chamber 35 behind the valve 34. The valve 20 is opened and the flow of air into the air expansion chamber 18 causes a rise in pressure therein, due to the constriction of the air passageway and the resistance to air flow due to the presence of the baffle element or valve 48, which latter, by reason of its screw threaded stem, may be adjusted at varying distances from the nozzle of said chamber to suit the pressure conditions desired in the expansion chamber. The flow of air into the chamber 18 and its increase of pressure therein causes the air to flow through the hollow stem or tube 57 into the expanding chamber or bellows 32, thereby causing expansion of said bellows to increase its axial dimension. Through the stem 65 the valve 34 is caused to be lifted from its seat, thus admitting gas under pressure from the chamber 35 to the chamber 31, and the gas flows therefrom through passage 40 to the chamber 41, and passes through the restricted orifice 43 into the chamber or conduit 22, where it is mixed with air flowing into said chamber or conduit through the nozzle of the chamber 18. By reason of the delivery of the air and gas through said nozzle 21 and orifice 43 under pressure, and by reason of the tortuous flow of the mixture through the pipes 23, to and through the manifold 24, the air and gas thus brought together at the nozzle of the chamber 18 are thoroughly admixed to produce a good combustible mixture.

The pressure of the air within the chamber 18 can be varied by moving the baffle element or valve 48 towards and from the nozzle 21 of said chamber, so as to thereby regulate the pressure of air in said chamber. This adjustment also regulates the pressure of air within the expanding chamber or bellows 32, so that it will be seen that the delivered pressure of air through the pipe 19 acts directly on the valve 34 to vary the opening of the port controlled by said latter valve. The valve 34 is held normally against its seat by the counterbalancing weight 61, and the gas pressure in the chamber 35, against the force of which the valve 34 is opened, and by varying the distance between the baffle element or valve 48 and the throat 21 the pressure and volume of air may be regulated with respect to the flow of gas through the port controlled by the valve 34 and the proper admixture of the fuel constituents will be constant and remain so regardless of the volume of flow of the mixture from the gas and air mixer.

I claim as my invention:

1. A gas and air mixer having separate air and gas inlet chambers which discharge into a common mixing chamber, the air inlet chamber having a tapering outlet to the mixing chamber, a manually controllable constricting and obstructing regulable element adjustable axially towards said air outlet to vary air pressure therein relatively to the source supplying air to said air chamber, and means whereby said air pressure controls flow of gas to said gas inlet chamber to maintain a predetermined desired mixture.

2. A gas and air mixer having a mixing chamber and comprising separate air and gas inlet chambers in communication with the mixing chamber, said air inlet chamber having a reducing outlet extending into a gas outlet at the mixing chamber, a constricting and obstructing manually regulable element wholly within the said air inlet chamber adjustable axially toward and from said reduced outlet to vary the pressure therein relatively to that of the source supplying air to said chamber, and means whereby said air pressure directly controls flow of gas to said gas inlet chamber.

3. A gas and air mixer having a mixing chamber and comprising separate air and gas inlet chambers in communication with the mixing chamber, a valve to control flow of gas to said gas inlet chamber, the air inlet chamber having a restricted discharge nozzle, a disc-like constricting and obstructing element wholly within said air inlet chamber adjustable towards and away from said nozzle in the axis of the latter to adjust flow of air through said nozzle, and means actuated by said air pressure to control said valve.

4. A gas and air mixer having a mixing chamber, air and gas inlet chambers discharging into said mixing chamber, a valve to control flow of gas under pressure to said gas inlet chamber, a hollow expanding element in communication with and receiving air from said air inlet chamber and connected to and controlling said valve, and means in the air inlet chamber to vary the pressure therein relatively to that of the source supplying air to said chamber and thereby maintain ratio proportions with different volume flow of the mixture.

5. A gas and air mixer having a mixing chamber, air and gas inlet chambers discharging into said mixing chamber, a valve to control flow of gas under pressure to said gas inlet chamber, a hollow expanding element in communication with and receiving air from said air inlet chamber and connected to and controlling said valve, and a manually regulable constricting and obstructing element within and adjacent to the outlet of said air inlet chamber adjustable axially of said outlet to vary the air pressure in said inlet chamber therein relatively to that of the source supplying air to said air inlet chamber.

6. A gas and air mixer having a mixing chamber, air and gas inlet chambers discharging into said mixing chamber, a valve to control flow of gas under pressure to said gas inlet chamber, a hollow expanding element in communication with said air inlet chamber and connected to and controlling said valve, said air inlet chamber having a restricted nozzle which extends into the mixing chamber, and a restricting and obstructing element wholly within said air inlet chamber and at and adjustable towards and away from said nozzle.

7. A gas and air mixer having a pressure chamber for gas, a valve therefor, a controller chamber and an air inlet chamber, a mixing chamber in communication with the controller chamber and said air inlet chamber, the latter through a hollow tapered nozzle, a hollow expanding element in said controller chamber in communication with said air inlet chamber and connected with and controlling said valve, and a constricting and obstructing element within said air inlet chamber axially adjustable towards and from the nozzle of said air inlet chamber.

8. A gas and air mixer having a pressure supply chamber for gas, a controller chamber and an air inlet chamber, a valve controlling the flow of gas from said supply chamber to said controller chamber, a passage leading from said controller chamber and terminating in an annular nozzle outlet which surrounds the outlet of said air inlet chamber, a mixing chamber into which said nozzles discharge, an expanding element in said controller chamber in open communication with said air inlet chamber, means connecting said expanding chamber to said valve to open the same, and means in said air inlet chamber to vary the pressure therein relatively to that of the source supplying air thereto.

9. A gas and air mixer having a pressure supply chamber for gas, a controller chamber and an air inlet chamber, a valve controlling the flow of gas from said supply chamber to said controller chamber, a passage leading from said controller chamber and terminating in an annular nozzle, said air inlet chamber having a restricted nozzle within the gas discharge nozzle, a mixing chamber into which said nozzles discharge, an expanding element in said controller chamber in communication with said air inlet chamber connected to and controlling said valve, and an obstructing element disposed axially of and movable towards and from the restricted nozzle of said air inlet chamber.

10. A gas and air mixer having a pressure chamber for gas, a controller chamber and an air inlet chamber, a mixing chamber in communication with the controller chamber and said air inlet chamber, a valve to control passage of gas from said pressure chamber to said mixing chamber, a hollow expanding element in said controller chamber in communication with said air chamber and connected with and controlling said valve, said expanding chamber having a concave upper wall and a round headed stem seated on said concave wall and connected to said gas valve.

In witness whereof I claim the foregoing as my invention, I hereunto append my signature this twenty-sixth day of February, 1920.

FRANKLIN H. WOLEVER.